(12) United States Patent
Quest

(10) Patent No.: US 12,059,942 B1
(45) Date of Patent: Aug. 13, 2024

(54) METHOD FOR DETECTING THAT REFRIGERANT IS AT A FULLY CHARGED LEVEL

(71) Applicant: AC Avalanche LLC, Valley View, OH (US)

(72) Inventor: Michael E. Quest, Brentwood, TN (US)

(73) Assignee: AC AVALANCHE, LLC, Valley View, OH (US)

( * ) Notice: Subject to any disclaimer, the term of this patent is extended or adjusted under 35 U.S.C. 154(b) by 0 days.

(21) Appl. No.: 17/022,996

(22) Filed: Sep. 16, 2020

Related U.S. Application Data

(62) Division of application No. 15/332,716, filed on Oct. 24, 2016, now abandoned.

(60) Provisional application No. 62/245,451, filed on Oct. 23, 2015.

(51) Int. Cl.
*B60H 1/00* (2006.01)

(52) U.S. Cl.
CPC ..... *B60H 1/00585* (2013.01); *B60H 1/00978* (2013.01)

(58) Field of Classification Search
CPC .......................... B60H 1/00585; B60H 1/00978
USPC .............................................................. 62/77
See application file for complete search history.

(56) References Cited

U.S. PATENT DOCUMENTS

| | | | |
|---|---|---|---|
| 8,322,151 B1* | 12/2012 | Garofalo | F24F 11/62 62/149 |
| 9,933,318 B2 | 4/2018 | Quest | |
| 10,173,492 B2 | 1/2019 | Quest | |
| 2005/0262855 A1* | 12/2005 | Hsieh | B60H 1/00585 62/149 |
| 2012/0046792 A1* | 2/2012 | Secor | F24F 11/56 702/45 |
| 2013/0245965 A1* | 9/2013 | Kane | G05B 23/0272 702/33 |
| 2014/0299289 A1* | 10/2014 | Alsaleem | F25B 49/00 165/11.1 |

* cited by examiner

*Primary Examiner* — Steve S Tanenbaum

(57) ABSTRACT

A system for indicating on an electronic device that the refrigerant being introduced by a user to an air conditioning system has reached its optimum fill level includes a sensor device having a main body, the sensor device being structured and disposed for measuring a range of data; a wireless transmitter on the sensor device, the wireless transmitter being in communication with the electronic device for wirelessly transmitting the range of data to the electronic device; an electronic application configured for use with the electronic device; and wherein the electronic application is structured and disposed for visually indicating to the user via the electronic device the transmitted range of data in real time and audibly indicating to the user via the electronic device when the transmitted range of data reaches a predetermined value.

10 Claims, 3 Drawing Sheets

METHOD FOR DETECTING THAT REFRIGERANT IS AT A FULLY CHARGED LEVEL

This application is based on and claims priority to provisional patent application No. 62/245,451 filed on Oct. 23, 2015.

BACKGROUND OF THE INVENTION

Field of the Invention

This invention relates to a device for indicating the output temperature of an air conditioning unit and, more particularly, to a sensor device securable in or adjacent to a vent for sensing one or more temperature output ranges and transmitting the one or more temperature output ranges to an electronic device.

Discussion of the Related Art

For many years, automobile air conditioners have included an orifice tube or expansion valve. Because an expansion valve is essentially a fixed valve with free flow of the refrigerant, the pressure as measured on both the high and low side is a function of both the amount of refrigerant therein, as well as the ambient temperature. A suitable pressure range for the correct refrigerant fill was established many years ago, which is based on increasing the pressure as the ambient temperature rises. More recently, automobile manufacturers have started using thermostatic expansion valves that are designed to meter, or restrict, the flow of refrigerant into the evaporator, thereby providing more efficient cooling by controlling the super heating at the evaporator outlet. The control of the metering is located at the outlet of the evaporator. These automobile manufacturers use the evaporator outlet temperature, independent of the ambient temperature, to regulate the thermostatic expansion valves, which meters the refrigerant flow and sets a maximum predetermined pressure at the evaporator outlet.

For systems using a thermostatic expansion valve, as refrigerant is added during servicing, the pressure on the low side rises until it reaches this predetermined maximum level. If this pressure level is below the gauge's established correct fill range, even if the system is fully charged, adding additional refrigerant will not bring the pressure reading up to gauge's established fully charge pressure reading. As additional refrigerant is added, the excessive pressure builds up on the high side and can only be measured using a high side gauge. Because the fully charged pressure using a thermostatic expansion valve remains constant and the gauge's fully charged requirement rises as the ambient temperature goes up, the higher the ambient temperature the larger the gap between the system being fully charged and it showing fully charged on the low side gauge. In these cases, using only a low side gauge can potentially cause too much refrigerant to be added and result in damage to the compressor or other problems associated with overcharging.

In light of the problems advanced above, there exists a need for a device for sensing one or more temperature output ranges and transmitting the one or more temperature output ranges to an electronic device for visually indicating when the correct amount of refrigerant has been introduced to an air conditioning system and preventing the problems associated with overfilling an air conditioner with refrigerant.

SUMMARY OF THE INVENTION

In accordance with one form of the present invention, there is provided a system for indicating on an electronic device that the refrigerant being introduced by a user to an air conditioning system has reached its optimum fill level, the system including a sensor device having a main body, the sensor device being structured and disposed for measuring a range of data; a wireless transmitter on the sensor device, the wireless transmitter being in communication with the electronic device for wirelessly transmitting the range of data to the electronic device; an electronic application configured for use with the electronic device; and wherein the electronic application is structured and disposed for visually indicating to the user via the electronic device the transmitted range of data in real time and audibly indicating to the user via the electronic device when the transmitted range of data reaches a predetermined value.

In accordance with another form of the present invention, there is provided a method for indicating on an electronic device that the refrigerant being introduced by a user to an air conditioning system has reached its optimum fill level, the method including the steps of providing a sensor device, the sensor device including a main body and a wireless transmitter, a fastener and the sensor device being structured and disposed for measuring a range of data; securing the sensor device on or adjacent to the vent of the air conditioning system using the fastener; measuring a range of data; wirelessly transmitting the measured range of data to the electronic device; providing an electronic application that is configured for use with the electronic device; visually indicating to the user via the electronic device the transmitted range of data in real time; and audibly indicating to the user via the electronic device when the transmitted range of data reaches a predetermined value.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Referring to the several views of the drawings, the sensor device for sensing one or more temperature output ranges and transmitting the one or more temperature output ranges to an electronic device 100 for visually indicating to a user that the refrigerant being introduced to an air conditioning system has reached its fill level is generally referred to as the sensor device 10.

Figure 1:
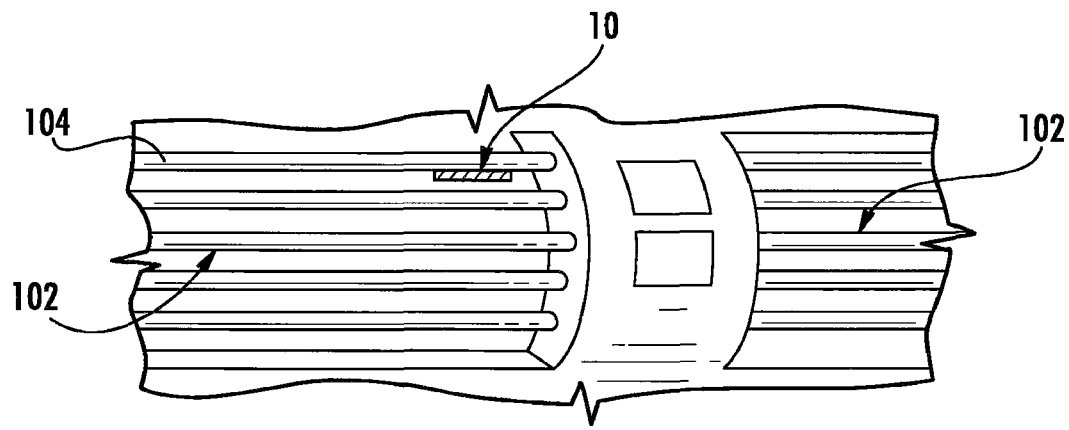
FIG. 1 is a perspective view of the sensor device of the present invention in accordance with one embodiment, shown secured to a vent.
Figure 4:
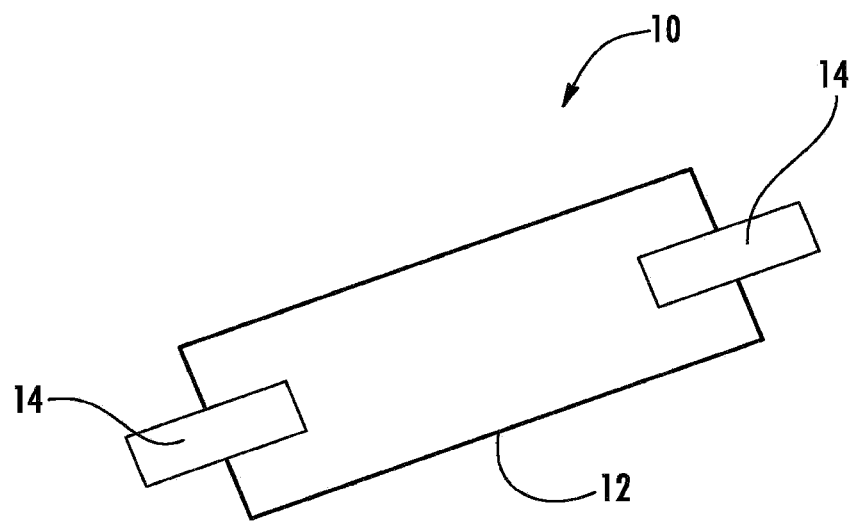
FIG. 4 is a perspective view of the sensor device of the present invention showing the bottom side of the sensor device.

Referring to FIG. 1, a first embodiment of the sensor device 10 is shown, wherein the sensor device 10 includes a wireless transmitter 12 and is configured to be secured to a vent 102, such as the air vent vane 104 on an automobile air conditioning vent 102, using a fastener 14 (see FIG. 4). Exemplary embodiments of the fastener 14 include snap-fit fasteners, hook and loop fasteners, adhesive fasteners, and magnetic fasteners. In one embodiment, the sensor device 10 measures a range of temperatures between minus-20 degrees Fahrenheit (−20° F.) and 150 degrees Fahrenheit (150° F.) in real time with an accuracy variable not exceeding 2 degrees Fahrenheit (2° F.).

Figure 2:
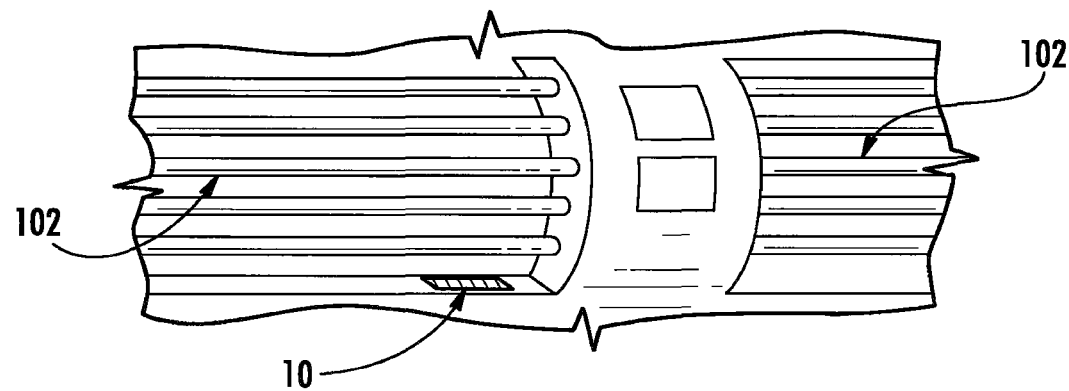
FIG. 2 is a perspective view of the sensor device of the present invention in accordance with one embodiment, shown secured to the inner facing wall of a vent channel.

Referring to FIG. 2, another embodiment of the sensor device 10 is shown, wherein the sensor device 10 is configured to be secured near a vent 102, such as an automobile air conditioning vent, such as on the inner facing surface of the vent channel of vent 102 by a fastener 14. Exemplary embodiments of the fastener 14 include hook and loop fasteners, adhesive fasteners, and magnetic fasteners. In one embodiment, the sensor device 10 measures a range of temperatures between minus-20 degrees Fahrenheit (−20° F.) and 150 degrees Fahrenheit (150° F.) in real time with an accuracy variable not exceeding 2 degrees Fahrenheit (2° F.).

Figure 3:
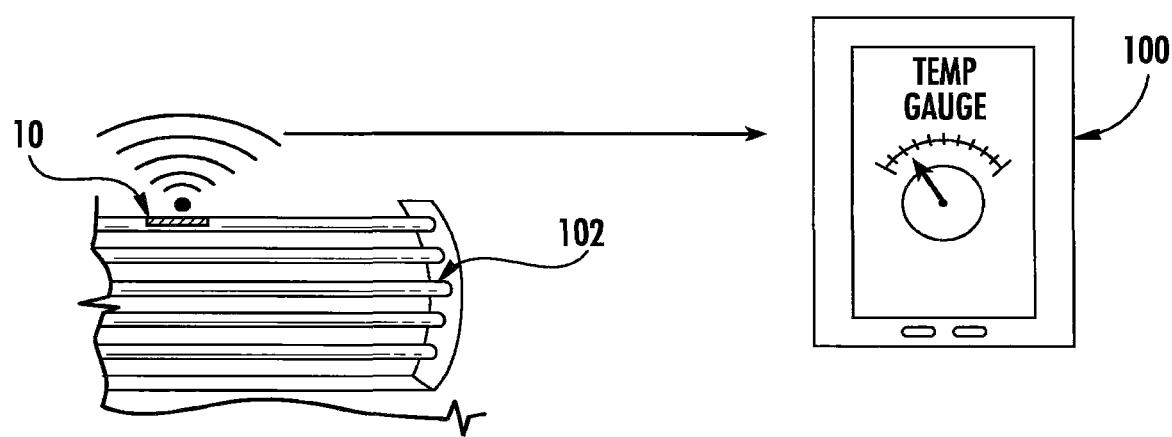
FIG. 3 is a perspective view of an electronic device receiving a transmission from the sensor device of the present invention.

Referring to FIG. 3, the sensor device 10 is shown in conjunction with an electronic device 100. In one embodiment, a software application is provided for downloadable use on the electronic device 100. Without limiting the features therein, the software application is structured and disposed for displaying the temperature transmitted by the sensor device 10 on the screen of the electronic device 100. In another embodiment, the electronic device 100 accesses a website on the World Wide Web which provides a web application for displaying the temperature transmitted by the sensor device 10 on the screen of the electronic device 100.

In a preferred embodiment, the software application or web application visually and/or audibly indicates to a user through the electronic device 100 when the temperature cools to a predetermined temperature value selected for indicating that the refrigerant has reached its fully charged, optimum fill level within the air conditioning system. Each of the above predetermined temperature values may be determined using established pressure levels for indicating the fill level of refrigerant as measured by low-side and high-side pressure gauges. By way of a non-limiting example, the software application or web application may be structured and disposed to visually and/or audibly deliver an indication through the electronic device 100 at a temperature of 50° F. or lower.

In operation, as refrigerant is introduced to the air conditioning system, cold air flows through the air vents 102 at a rate as selectively determined by a user. It is preferable for the air vent 102 to be set to permit cold airflow through the air vent 102 at its highest setting in order to most effectually determine when the refrigerant has reached the optimum fill level. As the refrigerant approaches optimum fill level, the air flowing through the air vent will become colder and the software application or web application causes the electronic device 100 to visually and/or audibly indicate such to the user.

While the present invention has been shown and described in accordance with several preferred and practical embodiments, it is recognized that departures from the instant disclosure are contemplated within the spirit and scope of the present invention.

What is claimed is:

1. A method for indicating on an electronic device that the refrigerant being introduced by a user of a vehicle air conditioning system has reached its optimum fill level, said method comprising the steps of:

providing a temperature sensor, said temperature sensor comprising:
a main body and a wireless transmitter;
a vent fastener; and
said temperature sensor being structured and disposed for measuring a range of temperature output;
securing said temperature sensor on a vent vane or an inner facing surface of a vent channel of a vent of said vehicle air conditioning system using said vent fastener;
selecting the vehicle air conditioning system highest airflow setting for permitting cold airflow through the vent of said vehicle air conditioning system;
introducing refrigerant into said vehicle air conditioning system;
measuring a range of temperature output data using the temperature sensor wherein said range of temperature output data is real time air temperature from the vent of said vehicle air conditioning system and said range of temperature output data has an accuracy variable not exceeding 2 degrees Fahrenheit (2°);
wirelessly transmitting the measured range of temperature output data to the electronic device;
providing an electronic application that is configured for use with the electronic device;
visually indicating to the user via the electronic application using the electronic device the transmitted range of temperature output data in real time; and
audibly indicating to the user via the electronic application using the electronic device when the transmitted range of temperature output data reaches a predetermined value at a temperature of 50° or lower.

2. The method as recited in claim 1 wherein said temperature sensor is structured and disposed for measuring temperatures between minus-20 degrees Fahrenheit (−20°) and 150 degrees Fahrenheit (150°).

3. The method as recited in claim 1 wherein said vent fastener is a snap-fit vent fastener.

4. The method as recited in claim 1 wherein said vent fastener is a hook and loop vent fastener.

5. The method as recited in claim 1 wherein said vent fastener is an adhesive vent fastener.

6. The method as recited in claim 1 wherein said vent fastener is a magnetic vent fastener.

7. The method as recited in claim 1 wherein said electronic application for use on the electronic device is a downloadable software application.

8. The method as recited in claim 1 wherein said electronic application for use on the electronic device is accessible via a website on the World Wide Web.

9. A method for indicating on an electronic device that the refrigerant being introduced by a user of a vehicle air conditioning system has reached its optimum fill level, said method consisting essentially of:

providing a temperature sensor, said temperature sensor comprising:
a main body and a wireless transmitter;
a vent fastener, wherein said vent fastener is a snap-fit vent fastener, a hook and loop vent fastener, an adhesive vent fastener or a magnetic vent fastener; and
said temperature sensor being structured and disposed for measuring a real time range of temperature output data from air flowing through a vent of a vehicle air conditioning system;

securing said temperature sensor on a vent vane or an inner facing surface of a vent channel of a vent of said vehicle air conditioning system using said vent fastener;

selecting the vehicle air conditioning system highest airflow setting for permitting cold airflow through the vent of said vehicle air conditioning system;

introducing refrigerant into said vehicle air conditioning system;

measuring a range of temperature output data between minus-20 degrees Fahrenheit (−20°) and 150 degrees Fahrenheit (150°) using the temperature sensor, wherein said temperature sensor is measuring real time air temperature from the vent of said air conditioning system and said range of temperature output data is a range of temperatures with an accuracy variable not exceeding 2 degrees Fahrenheit (2°);

wirelessly transmitting the measured range of temperature output data to the electronic device;

providing an electronic application that is configured for use with the electronic device; and visually indicating to the user of said vehicle air conditioning system via the electronic application using the electronic device the transmitted range of temperature output data in real time to indicate when the transmitted range of temperature output reaches a predetermined value at a temperature of 50° or lower.

10. The method as recited in claim 9 further comprising the step of audibly indicating to the user of said vehicle air conditioning system via the electronic application using the electronic device when the transmitted range of temperature output data reaches a predetermined value at a temperature of 50° or lower.

* * * * *